W. E. BROWN AND P. C. SEEGMUELLER.
CHUCK.
APPLICATION FILED NOV. 17, 1919.
1,377,663. Patented May 10, 1921.
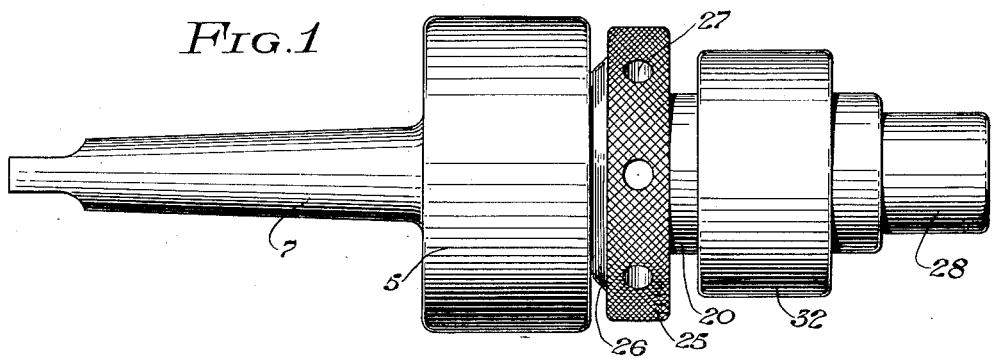
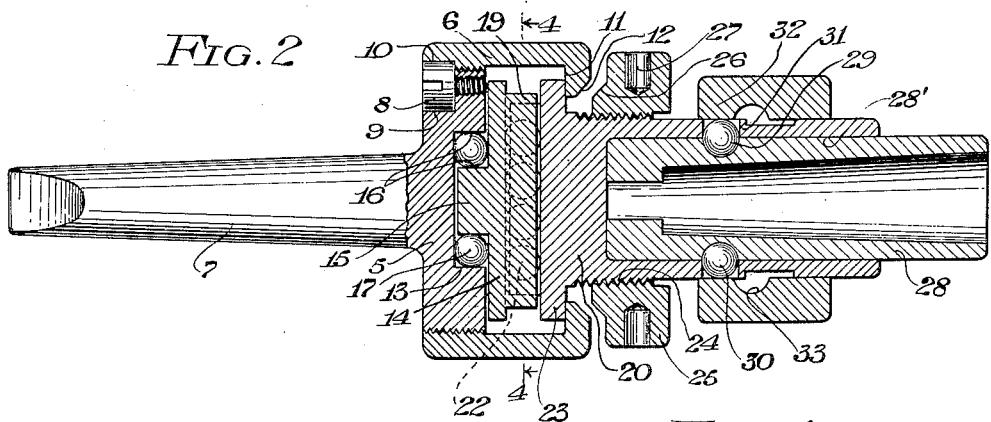
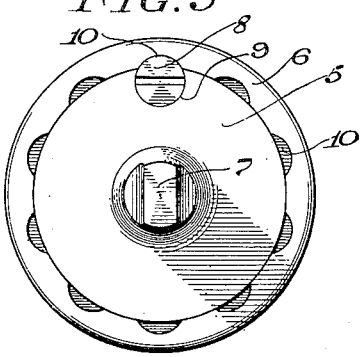
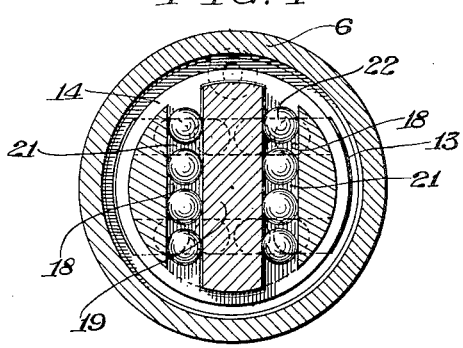
WITNESSES.
INVENTORS
William E. Brown &
Paul C. Seegmueller
By R. S. Caldwell
ATTORNEY.

UNITED STATES PATENT OFFICE.

WILLIAM E. BROWN AND PAUL C. SEEGMUELLER, OF DETROIT, MICHIGAN.

CHUCK.

1,377,663.  Specification of Letters Patent.  Patented May 10, 1921.

Application filed November 17, 1919. Serial No. 338,703.

*To all whom it may concern:*

Be it known that we, WILLIAM E. BROWN and PAUL C. SEEGMUELLER, citizens of the United States, and residents of Detroit, in the county of Wayne and State of Michigan, have invented new and useful Improvements in Chucks, of which the following is a description, reference being had to the accompanying drawings, which are a part of this specification.

The invention relates to a duplex chuck.

The object of the invention is to provide a chuck, all parts of which may be rigidly secured together for drilling and parts of which may be allowed to float out of line with the body to allow the chuck to be used for reaming or tapping without cramping the reamer or tap, thereby avoiding breakages that commonly occur with a rigid chuck.

The invention further consists in the several features hereinafter set forth and more particularly defined by claims at the conclusion hereof.

In the drawings: Figure 1 is an elevation view of the chuck embodying the invention; Fig. 2 is a vertical section view through the chuck; Fig. 3 is a view of the rear end of the chuck; Fig. 4 is a section taken on the line 4—4 of Fig. 2.

The numeral 5 designates the body of the chuck provided with a tubular chuck adjusting nut 6 and a tapered shank 7. The adjusting nut 6 is in the form of a sleeve member having threaded engagement with the main body portion and held locked thereto by a screw 8, the head of which may seat in any one of the recesses formed by a recess 9 in the body portion registering with any one of the recesses 10 in the rear end of the nut. The adjusting nut 6 is provided with an inwardly extending annular flange 11 at its front end provided with a beveled face 12.

The front face of the main body portion of the chuck is provided with a transversely extending recess 13. A connecting member 14 has a transversely extending tongue or projection 15 on one face which seats in said recess and forms therewith spaced transversely extending guideways 16 in which a plurality of balls 17 are mounted. This construction permits of a sliding movement between the body of the chuck and the member 14 in one direction.

The other face of the member 14 has a transversely extending tongue 19 therein disposed at an angle preferably at right angles to the tongue 15. A recess 18 on a sleeve member 20 receives the tongue and forms therewith spaced transversely extending guideways 21 in which a plurality of balls 22 are mounted, said guideways being disposed at an angle, preferably a right angle, to the guideways 16. This construction permits of a sliding movement between the members 14 and 20. The member 14, due to its connection with the chuck body and the member 20 through the balls, forms a two way sliding joint connection between the chuck body and the member 20. It will be understood that the balls may be omitted if desired, but by using them the longitudinal thrust is taken care of and the sliding surfaces are relieved of friction to a great extent.

The member 20 has an annular flange 23 engaging the flange 11 of the nut 6 and said nut holds said member and the member 14 clamped between it and the body of the chuck, the wear between the sleeve member 20 and the nut being taken up when necessary by removal of the screw 8 and turning back of the nut onto the body and replacement of the screw into one of the recesses formed by the recess 9 and one of the recesses 10.

The sleeve member 20 has a threaded portion 24 adjacent its flange and carries a lock washer or nut 25 provided with a beveled face 26 and a plurality of holes 27 to receive a spanner wrench so that said nut 25 may be turned to bring its face 26 into clamping engagement with beveled face 12 of the nut 6 and thereby rigidly clamp the member 20 to the body of the chuck, the clamping of these parts together also centering the sleeve with respect to the chuck body.

The sleeve may be provided with any suitable tool clamp and we have shown here a well known form of device consisting of a tool socket 28 mounted in a bore 28' in the sleeve member 20 and having a plurality of semi-spherical pockets 29 in which clutch balls 30 are mounted, said clutch balls being also movable in holes 31 in the sleeve member and being held in locked position by means of a sleeve 32. To unlock the socket the sleeve member 32 is moved to bring a curved annular groove 33 therein in line with the holes 31 so that the balls 30 can be moved outwardly from their seats in the socket 28. The member 20 forms a part of the tool holder.

When it is desired to use the chuck for drilling, the parts are rigidly clamped together by tightening the nut 25 up against the nut 6. When it is desired to use the chuck for reaming or tapping, the nut 25 is loosened up and this permits the sleeve member 20 to float in the chuck, that is, it is free to slide in two directions due to its connection with the chuck body through the connector 14 and balls 17 and 22 though it is driven by the chuck. This allowance for the member 20 carrying the reamer or tap to float out of line with the chuck body prevents cramping the reamer or tap and thus avoids breakages that commonly occur with a rigid chuck.

We desire it to be understood that this invention is not limited to any specific form or arrangement of parts except in so far as such limitations are specified in the claims.

What we claim as new and desire to secure by Letters Patent is:

1. In a chuck, the combination of a chuck body provided with a sleeve portion having a flanged end, a tool holder including a member having a flanged end within said sleeve portion and abutting the flanged end thereof, a clamping nut carried by said holder and movable thereon to clamp said member to the flanged end of said sleeve portion, and a driving connection within said sleeve portion between said member and chuck body to permit said member to move out of line with said body when said clamping nut is in inoperative position.

2. In a chuck, the combination of a chuck body having a recess and a flanged end adjacent thereto provided with a beveled outer face, a tool holder including a member having a flanged end disposed within said recess and abutting the flanged end of the chuck body, a connector between said member and chuck body permitting said tool holder to float out of line with said body, and a nut having a beveled face and adjustably mounted on said holder to bring its beveled face into engagement with that on said body to clamp said member to the chuck body and center it with respect thereto.

3. In a chuck, the combination of a chuck body having a shank portion and a main body portion provided with a centrally disposed recess, a tubular nut having threaded engagement with said body portion and provided with a flanged end having a beveled outer face, a tool holder including a member having a flanged end disposed within said nut and abutting the flanged end thereof and provided with a recess extending at an angle to the recess in said body portion, a connector having a projection seated in the recess in the body portion and spaced from the sides thereof, and a projection seated in the recess in the tool holder and spaced from the sides thereof, ball bearings interposed between the sides of the aforenamed recesses and the projections on said connector, said tool holder having an exteriorly threaded shank portion, and a nut adjustably mounted on said threaded shank portion and provided with a beveled face adapted to be turned into engagement with the beveled face on said tubular nut.

In testimony whereof we affix our signatures in presence of two witnesses.

WM. E. BROWN.
PAUL C. SEEGMUELLER.

Witnesses:
MARION S. BROWN,
J. H. BAER.